United States Patent [19]

Furlong

[11] Patent Number: 4,630,388

[45] Date of Patent: Dec. 23, 1986

[54] DETACHABLE SWIVEL FOR COUPLING GANGIONS TO LONGLINES AND APPARATUS FOR AUTOMATICALLY ATTACHING SAME

[76] Inventor: Donn B. Furlong, 15427 Westwick Rd., Snohomish, Wash. 98290

[21] Appl. No.: 805,408

[22] Filed: Dec. 4, 1985

Related U.S. Application Data

[63] Continuation of Ser. No. 658,179, Oct. 5, 1984, abandoned.

[51] Int. Cl.⁴ .......................................... A01K 91/04
[52] U.S. Cl. .................................. 43/27.4; 43/44.84; 43/44.91; 43/57.3
[58] Field of Search ............... 43/4, 27.4, 44.84, 44.9, 43/44.91, 57.3

[56] References Cited

U.S. PATENT DOCUMENTS

| | | | |
|---|---|---|---|
| 578,248 | 3/1897 | Layne | 43/27.4 |
| 2,564,260 | 8/1951 | Houser | 24/237 |
| 2,644,263 | 7/1953 | Allen | 43/27.4 |
| 2,876,517 | 3/1959 | Stanley | 24/131 |
| 3,081,577 | 3/1963 | Brown | 43/54.5 |
| 3,435,552 | 4/1969 | Caldwell | 43/43.15 |
| 3,533,184 | 10/1970 | Kerr | 43/44.84 |
| 3,818,625 | 6/1974 | Shults | 43/54.5 |
| 4,149,336 | 4/1979 | Huse | 43/44.9 |
| 4,277,905 | 7/1981 | Huse | 43/4 |
| 4,407,087 | 10/1983 | Huse | 43/4 |
| 4,428,142 | 1/1984 | Shedd et al. | 43/43.1 |

FOREIGN PATENT DOCUMENTS

236894 11/1969 U.S.S.R. ........................ 43/44.84

Primary Examiner—Nicholas P. Godici
Assistant Examiner—Christopher L. McKee
Attorney, Agent, or Firm—Seed and Berry

[57] ABSTRACT

A swivel device for coupling gangions to longlines and an apparatus for automatically attaching the same. The device includes a cylindrical stop sleeve fixedly attached to the longline, and a detachable swivel body with an aperture therethrough sized for rotatably receiving the sleeve therein. The body has a sidewall opening communicating with the body aperture and sized to allow lateral passage of the longline, but not the sleeve, therethrough. The body has an ear for attachment of the gangion and has depressable stops spaced apart for receiving the sleeve therebetween and restraining axial movement of the body relative to the sleeve while permitting rotational movement thereabout. The stops have axially outward facing cams which depress the stops when engaged by a tool or by a sleeve entering the body aperture. The apparatus has a gravity-feed track for loading a plurality of swivel bodies, and a swing arm having a carrier positioned to receive the bodies from the track and releasably hold the bodies in position, with the longline extending through the body aperture in preparation for receipt of a sleeve therein. The swing arm is movable to a release point in response to the travel of the sleeve with the longline. A retainer allows escapement of individual swivel bodies from the feed track while retaining the remainder of the bodies on the track until the swing arm is in position to receive another body. A stop guide is positioned to limit travel of the bodies fed from the track to the swing arm.

31 Claims, 15 Drawing Figures

DETACHABLE SWIVEL FOR COUPLING GANGIONS TO LONGLINES AND APPARATUS FOR AUTOMATICALLY ATTACHING SAME

This application is a continuation of U.S. patent application Ser. No. 658,179, filed Oct. 5, 1984, now abandoned under C.F.R. §1.62.

DESCRIPTION

1. Technical Field

The present invention relates generally to longlines commonly used for taking bottom fish, such as halibut, cod and the like, wherein a groundline is provided with spaced gangions which carry the fishhooks. More specifically, the present invention relates to a detachable swivel for coupling gangions to the longlines and an apparatus for automatically attaching the swivels.

2. Background Art

The type of gear generally used in longline bottom fishing consists of a groundline having a plurality of gangions tied thereto at spaced intervals, with each of the gangions being provided with a fishhook. The length of the gangions and their spacing on the groundline depend upon the type of fish which is to be caught. As an example, in halibut fishing, the gangions are placed on the groundline at intervals of from 9 to 13 feet, with the gangions being 3 to 4 feet in length and having a diameter of approximately 1/6 inch. The groundlines may have a diameter of from ¼ to 5/16 inch and have a length of from 1500 to 1800 feet. Each individual length of groundline is known as a "skate," and a number of skates, typically 3 to 7, are tied together and called a "string of gear." After the skates have been baited and tied together, the string of gear is set in the water.

The setting of a string of gear is accomplished by fastening one end to an anchor which is provided with a buoy line and a buoy. The buoy and buoy line are let out first and then the anchor is thrown overboard, followed by the skates, which run out through a chute at the rear of the boat. An attendant fastens a second anchor to the other end of the string of gear. The second anchor is also provided with a buoy line and a buoy, all of which are, in turn, put into the water.

After the string of gear has been on the bottom for a desired length of time, depending upon the particular fishing ground, it is taken back aboard the boat and the fish are removed. The skates may be taken in from either end; and frequently, the skates are taken in from the end which was set out first and which has been on the bottom the longest. The string of gear is taken in by first taking in the buoy and buoy line so as to raise the anchor. The buoy line is then coiled onto the deck and the skates are hauled in over a side roller at the boat railing. A man at the roller normally takes the fish off the hooks as the skates are hauled in and the skates are coiled onto the deck or onto a drum. Before the skates are set again, the hooks must be baited, usually by hand or automatically.

Since the gangions frequently are wound around the groundline from the swimming of the fish or the motion of the gangions in the water when the string of gear is taken in, they must be unwound by hand before the hooks are baited. As will be appreciated by those familiar with the procedure, the job of removing the turns of gangion wound around the groundline is very time-consuming and hard work. In some instances, the gangions become so wound around the groundline and entangled that the tangle cannot be removed and an entire skate must be thrown away and replaced at great expense.

Careful handling must be provided when the skates are coiled on the deck or wound on a drum since the gangions are still attached and can easily become entangled. To avoid the problem, great care must be taken when coiling or winding the skate, with the gangion and attached hooks pulled to one side, free of the groundline. This is another very time-consuming aspect of fishing.

In the past, attempts have been made to overcome the winding problem by use of swivels which allow the gangions to freely swivel about the groundline. While the swivels solve the problem of the gangions winding about the groundlines, the problem of entanglement when the skates are coiled on deck or wound on a drum still exists. Several attempts have been made to use a swivel and also overcome this problem by making the gangion detachable from the groundline, such as shown in U.S. Pat. No. 3,533,184 and 4,149,336. While avoiding the above-described problems, the devices of these patents are difficult to operate and do not lend themselves well to automatic attachment and detachment to the groundline. In the '336 patent, a large and irregularly spaced swivel mechanism remains on the groundline, and only the gangion is removed using a ring clip. The devices also appear to be limited in the amount of pulling force that can be applied to the gangion by a fish before sufficient force is achieved to separate the ring clip from the stud, in the case of the '336 patent, and to separate the hinged arms of the snap-on clip from the groundline, in the case of the '184 patent. While no apparatus is shown in the '184 patent for automatic attachment of the snap-on clips to the longline, it appears that no simple and reliable means of attaching and detaching the devices of either the '184 or '336 patent exist.

It will therefore be appreciated that there has been a significant need for a detachable swivel for coupling gangions to longlines and an apparatus for automatically attaching the swivels to the longlines which avoid the aforementioned problems and disadvantages. The present invention fulfills this need and further provides other related advantages.

DISCLOSURE OF INVENTION

The present invention resides in a device for connecting a gangion to a continuous longline, and an apparatus for automatically attaching the device to the longline. The device has a stop member fixedly attached to the longline, and a swivel body with an aperture therethrough sized for rotatably receiving the stop member therein. The body has a sidewall opening communicating with the body aperture and sized for passage of the longline laterally therethrough for attaching and detaching the body from the longline. The body further has means for attachment of the gangion to the body and restraining means for releasably restraining the stop member in the body against axial movement. Axial movement of the body relative to the stop member is selectively inhibited to prevent longitudinal movement of the body along the longline during fishing and hauling while still permitting rotational movement thereabout. Axial movement of the stop member out of the body aperture is selectively permitted for detachment of the body from the longline. The body aperture is sized small enough to prevent lateral passage of the stop member therethrough.

The stop member is a substantially cylindrical stop sleeve having an axial aperture sized for receiving the longline therein. The body aperture is substantially cylindrical for receiving and maintaining the stop sleeve coaxially therein. The body aperture has axial end openings for passage of the stop sleeve into and out of the body aperture from either of the end openings. The end openings are outwardly bevelled to facilitate entry of the stop sleeve.

The restraining means includes a pair of oppositely oriented, axially extending elongated arms positioned side by side. The arms each have a first end portion with an inwardly facing stop opposing the stop of the other arm. The stops are spaced apart for engaging opposing ends of the stop sleeve and restraining the stop sleeve therebetween, and are located toward opposite ends of the body aperture. The arms each have an opposite second end portion with an inwardly facing hook, opposing the hook of the other arm. The hooks are positioned for engaging a portion of the body and preventing axial movement of the arms relative to the body when one of the arm stops forcefully engages a corresponding one of the stop sleeve ends. Axial force between the stop sleeve and the arm stops is thereby transmitted through the arm hooks to the body.

The engagement arms are resiliently biased into a projecting position for engagement of the arm stops with the stop sleeve ends to maintain the stop sleeve in the body aperture. The arms are individually and selectively movable into a retracted position for entrance and release of the stop sleeve into and from the body aperture. The first end portions of the engagement arms each have a cam engageable with a tool or the stop sleeve for moving the engagement arm into the retracted position. The cam projects axially outward beyond the body and slopes outwardly and away from the axel center line of the body aperture. The cam is movable away from the axial center line upon engagement with a tool or the stop sleeve to move the engagement arm into the retracted position.

As such, a stationary tool positioned adjacent to the longline can enter between the longline and the cam as the longline carries the body toward the tool and then move the cam to place the engagement arm into the retracted position using the longline to apply the counterforce to the tool, relying only on the power of the travelling longline. The first end portions of the engagement arms are also manually operable to move the engagement arms into the retracted position. The swivel body is easily attachable to and detachable from the longline body.

The bias is applied to the engagement arms by a spring. The spring has a first pair of oppositely extending leaf springs for biasing one of the engagement arms into the projecting position, and a second pair of oppositely extending leaf springs positioned adjacent to the first pair of leaf springs for biasing the other of the engagement arms into the projecting position. The two pair of leaf springs are joined together along their midportions.

The body portion for attachment of the gangions is circumferentially positioned away from the body sidewall opening sufficiently to rotate the swivel body and place the sidewall opening generally upward under the weight of the gangions to facilitate the body falling free of the longline by gravity upon operation of one of the engagement arms and passage of the stop sleeve from the body aperture when the longline has a generally horizontal attitude. The weight of the body is distributed to rotate the body on the longline when in a generally horizontal attitude and place the sidewall opening generally upward to also facilitate the body falling free of the longline by gravity. The body portion for attachment of the gangion is an aperture sized to receive the gangion and having sufficient size to also receive and frictionally retain therein the barbed end of the hook attached to the gangion.

The apparatus for attaching the swivel body to the longline includes feed means for sequentially feeding individual ones of a plurality of the swivel bodies onto the longline, with the longline passing laterally through the body sidewall opening. Also included is positioning means for receiving the swivel body from the feed means and holding the received body in position, with the longline within the body aperture in preparation for passage of one of the stop members attached to the longline into the body aperture for retention therein by the body-restraining means as the longline is set out. Release means are provided for selectively releasing the received swivel body, with one of the stop members within the body aperture, from the positioning means. Control means selectively permit travel of a swivel body to the positioning means from the feed means, and restrict travel of the next swivel body to be fed by the feed means until the swivel body received by the positioning means has been released by the release means.

The feed means includes a downwardly inclined track for loading with a plurality of the swivel bodies, with the swivel bodies being oriented with the body sidewall opening facing downwardly. The bodies are guided by the track for gravity-feed movement downward toward the longline. The longline is positioned at a lower dispensing end of the track and extends generally transverse thereto. The positioning means includes a carrier positioned to sequentially receive individual swivel bodies from the track lower end and to releasably hold the received bodies in position, with the longline extending through the body aperture in preparation for passage of one of the stop members therein. The carrier and track lower end are positioned for the swivel body to travel toward the longline and have the longline pass laterally through the sidewall opening of the received body as the body travels from the track lower end to the carrier. The release means includes a swing arm having a free end attached to the carrier. The swing arm is mounted for pivotal movement of the free end in the general direction of the longline movement responsive to the longline being set out with one of the stop members within the body aperture of the received body. The swing arm moves the carrier in an arcuate path to a release position away from the track lower end whereat the received body is released from the carrier. The swing arm is biased to return the carrier to a home position to receive the next swivel body.

The control means includes a stop guide positioned spaced apart from the track lower end sufficiently for the carrier to be moved therebetween. The stop guide limits travel of the swivel body received by the carrier from the track and maintains the received swivel body in position on the carrier in preparation for movement therewith. The control means also includes an arcuate retainer wall attached to the swing arm for movement therewith. The retainer wall has an opening therethrough to permit free travel of a swivel body from the track lower end to the carrier when the carrier is in the home position. The retainer wall extends in a direction to retain the remainder of the swivel bodies on the track as the carrier moves away from the home position to or from the release position. With this apparatus, a plurality of swivel bodies can be loaded on the track and gravity fed, with the bodies being attached to the longline and removed from the apparatus powered solely by the movement of the longline as it is set out.

The swivel bodies have a pair of opposing guide arms, and the track has a downwardly inclined slide plate for slidably receiving and dispensing the bodies. The carrier is a disc sized to be slidably received by the guide arms of the received body and released from the guide arms when the swing arm moves the carrier to the release position. The track is removable for preloading with swivel bodies and is selectively insertable in the apparatus for dispensing of the preloaded bodies.

Other features and advantages of the invention will become apparent from the following detailed description, taken in conjunction with the accompanying drawings.

BRIEF DESCRIPTION OF THE DRAWINGS

FIG. 4 is an enlarged perspective view of a side roller from below, with the swivel device being automatically detached as the longline is hauled in.

FIG. 5 is an enlarged exploded view of the swivel device of the present invention.

FIG. 6 is an enlarged perspective view of the stop sleeve of the swivel device shown in FIG. 5, with the sleeve spread apart for attachment to the longline.

FIG. 7 is a sectional elevational view of the stop sleeve shown in FIG. 6 fixedly attached to the longline.

BEST MODE OF CARRYING OUT THE INVENTION

Figure 1:
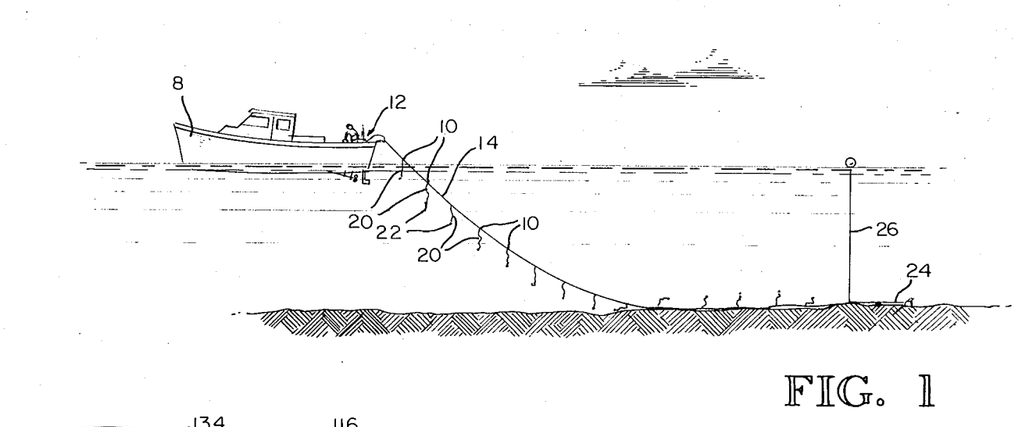
FIG. 1 is a perspective view of a fishing boat setting out a longline using the swivel device of the present invention.

As shown in the drawings for purposes of illustration, the present invention is embodied in a swivel device, indicated generally by reference numeral 10, and an apparatus, indicated generally by reference numeral 12, for automatically attaching the swivel device to a longline 14. The swivel device 10 includes a stop sleeve or ferrule 16 fixedly attached at spaced intervals along the longline 14, and a swivel body 18 detachably connectable to the stop sleeve. A gangion 20 is tied to the swivel body 18 by one end and has a hook 22 tied to its other end. As shown in FIG. 1, with the hooks 22 baited, the longline 14 is set out over the stern of the boat 8 with an anchor 24 and a buoy line and buoy 26 fastened to the one end of the longline. As previously described, the longline 14 generally has a second anchor and buoy fastened to its other end, and the entire longline is put into the water.

Figures 4, 5, 6, 7:
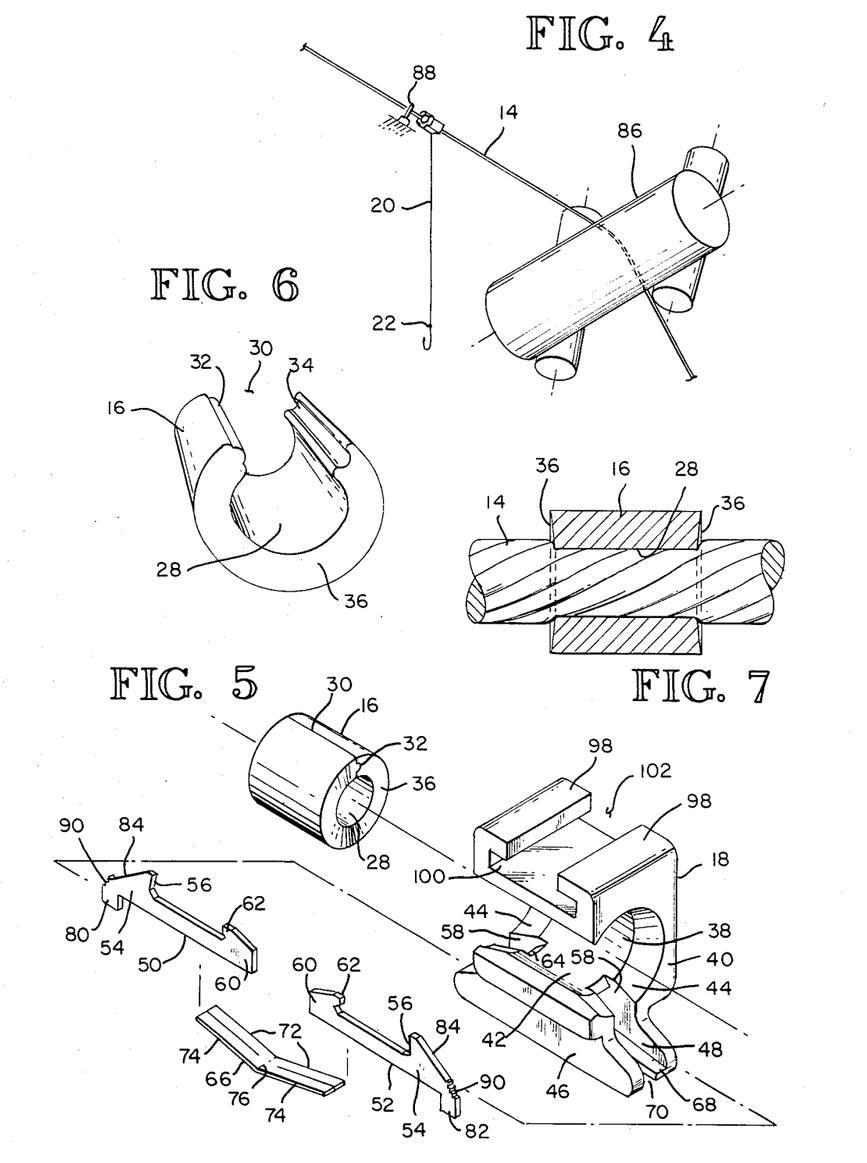
Figure 8:
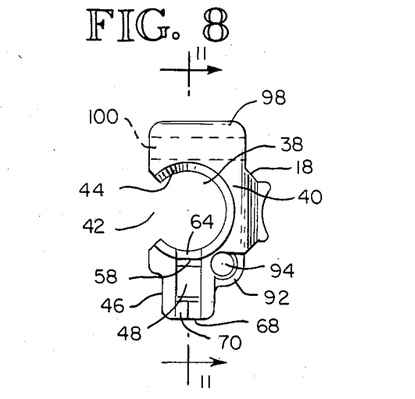
FIG. 8 is an enlarged end elevational view of the swivel body of the swivel device shown in FIG. 5.

As best shown in FIGS. 6 and 7, the stop sleeve 16 is a substantially cylindrical sleeve having an axial aperture 28 therethrough sized for receiving the longline 14 therein. For mounting of the stop sleeve 16 on the longline 14, the sleeve is provided with an axially extending sidewall opening 30 communicating with the interior sleeve aperture 28 for permitting placement of the sleeve around the longline at a preselected location. The sidewall opening 30 is closed, with the longline 14 in the sleeve aperture 28, by a crimping operation. The sleeve aperture 28 is sized to tightly grasp the longline 14 when the sidewall opening 30 is closed. The sidewall opening 30 is defined by a pair of opposing edge walls 32 and 34 of the sleeve sidewalls. The one edge wall 32 has an axially extending tongue formed thereon, and the other edge wall 34 has a mating, axially extending groove therein to receive the tongue when the sidewall opening 30 is closed. The stop sleeve 16 has a pair of inwardly tapering end walls 36.

The swivel body 18 of the swivel device 10 has a substantially cylindrical laperture 38 therethrough sized for rotatably receiving the stop sleeve 16 therein in a substantially coaxial relationship. The body 18 is formed by a sidewall 40 having an axially extending sidewall opening 42 therein. The sidewall opening 42 communicates with the body aperture 38 and is sized large enough to allow lateral passage of the longline 14, but small enough to prevent lateral passage of the stop sleeve 16 therethrough. The body aperture 38 has outwardly bevelled end openings 44 to facilitate entry of the stop sleeve 16 therein. As will be described in more detail below, the swivel body 18 is positioned relative to the longline 14 for receiving of the stop sleeve 16 into the body aperture 38 by moving the swivel body 18 to pass the longline laterally through the sidewall opening 42. With the longline 14 positioned coaxially within and extending through the body aperture 38, the swivel body 18 need only be held stationary until the movement of the longline carries the stop sleeve 16 into the body aperture.

Figures 10, 11, 12:
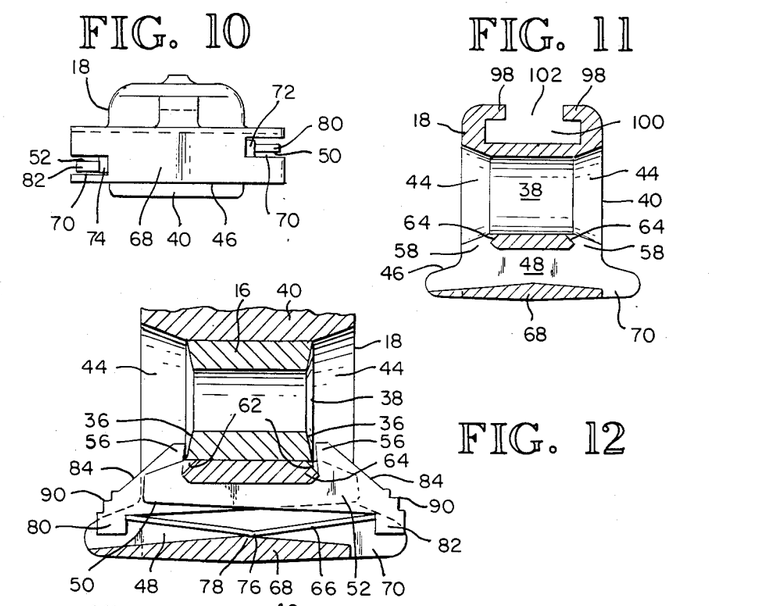
FIG. 10 is a bottom plan view of the swivel body of FIG. 8.
FIG. 11 is a sectional view taken substantially along line 11—11 of FIG. 8.
FIG. 12 is an enlarged fragmentary sectional side view of the swivel body of FIG. 8 with a stop sleeve positioned therein.

The swivel body 18 has rigidly attached to its sidewall 40 and formed integrally therewith an open-ended channel 46 with an elongated interior channelway 48 for holding therein a pair of oppositely extending, elongated arms 50 and 52. The channel 48 and the arms 50 and 52 are axially oriented with respect to the body aperture 38. The arms 50 and 52 are positioned side by side, and each has a first end portion 54 with an axially inward facing stop 56 opposing the stop of the other arm. The stops 56 project radially inward through cutaway portions 58 in the sidewall 40 of the swivel body 18 and extend into the body aperture 38 to block passage of the stop sleeve 18 from the body aperture when the stops are in a projecting position, such as shown in FIG. 12.

The stops 56 are located toward the opposite end openings 44 of the body aperture 38 and are spaced apart for receiving the stop sleeve 16 therebetween when the stop sleeve is positioned in the body aperture 38. The stops 56 engage the respective opposing end walls 36 of the stop sleeve 16 to restrain axial movement of the body 18 relative to the stop sleeve while permitting rotational movement thereabout. The stops 56 are spaced apart sufficiently to loosely receive the stop sleeve 16 therein without allowing appreciable axial movement of the swivel body 18 relative to the stop sleeve.

Each of the arms 50 and 52 has a second end portion 60 opposite the first end portion 54. The second end portion includes an inwardly facing hook 62 opposing the hook of the other arm. The hooks 62 are positioned for engaging a bevelled end portion 64 of the body sidewall 48 defining the inward extent of the cutaway portion 58. The hooks 62 prevent axial movement of the arms 50 and 52 relative to the body 18 when one of the arm stops 56 forcefully engages a corresponding one of the end walls 36 of the stop sleeve 16. As such, an axial force between the stop sleeve 16 and the stop 56 of the one of the arms 50 or 52 is transmitted through the hook 62 of the arm to the body portion 64. In this manner, a strong connection is provided between the stop sleeve 16 and the body 18 sufficient to handle the force of a large fish pulling on the gangion 20 without separating the body from the sleeve. The engagement force between the stop sleeve 16 and the body 18 is independent of the force which is necessary to purposely remove the stop sleeve from the body aperture 38, which will be described hereinafter.

The engagement arms 50 and 52 are resiliently biased into the projecting position for engagement of the stops 56 with the end walls 36 of the stop sleeve 16 by a spring 66 positioned between the arms and a wall 68 defining a part of the channel 48 and spaced apart from the sidewall 40 of the body 18. The wall 68 has a pair of axially extending slots 70, one positioned under each of the first end portions 54 of the arms 50 and 52. The spring 66 has a first pair of oppositely extending leaf springs 72 joined at a common end for biasing the arm 50 into the projecting position. The spring 66 also has a second pair of oppositely extending leaf springs 74 joined together at a common end for biasing the arm 52 into the projecting position. The first and second pairs of leaf springs 72 and 74 are positioned adjacent to each other, with the common ends joined to form a midportion 76 of the composite spring. In the presently preferred embodiment of the invention, the spring is manufactured as an integral unit.

The first and second pairs of leaf springs 72 and 74 are bent at the midportion 76; and when installed in the channel 46, the midportion rests on a crown portion 78 of the wall 68 located midway between the end openings of the channelway 48. The free end of one leaf spring of the first pair of leaf springs 72 bears against the underside of the first end portion 54 of the arm 50 and is retained against movement out of the channel 46 in the direction toward the first end of the arm by a radially outward extending tab 80 of the arm portion. The free end of the other leaf spring of the first pair of leaf springs 72 bears against the underside of the second end portion 60 of the arm 50. In like manner, the free end of one leaf spring of the second pair of leaf springs 74 bears against the underside of the first end portion 54 of the arm 52 and is retained against movement out of the channel 46 in the direction toward the first end of the arm by a radially outward extending tab 82 of the arm. The free end of the other leaf spring of the second pair of leaf springs 74 bears against the underside of the second end portion 60 of the arm 52. As previously noted, the midportion 76 of the spring 66 bears against the crown 78 of the wall 68 and provides the counterforce for operation of the spring.

The engagement arms 50 and 52 are individually and selectively movable into a retracted position whereat the stops 56 are retracted below the interior surface of the body sidewall 40 for free and uninhibited entry and release of the stop sleeve 16 into or out of the body aperture 38. The first end portion 54 of each of the engagement arms 50 and 52 has a cam 84 projecting radially outward beyond the body 18 and sloping outwardly and away from the axial center line of the body aperture 38. The cam 84 is positioned for engagement with the stop sleeve 16, with the longline 14 extending through the body aperture 38, as the stop sleeve begins to enter the body aperture. The stop sleeve 16 engaging the cam 84 moves the first end portion 54 of the corresponding arm 50 or 52 into the retracted position. As such, the stop sleeve 16 can enter the body aperture 38 from either end opening 44 with little interference from the first end portion 54 of the arms 50 and 52 or the stops 56 forming a part thereof. However, the stops 56, after returning to the projecting position, retain the stop sleeve 16 within the body aperture 38 even when a great force is applied which would tend to pull the body 18 and the stop sleeve apart.

Figure 13:
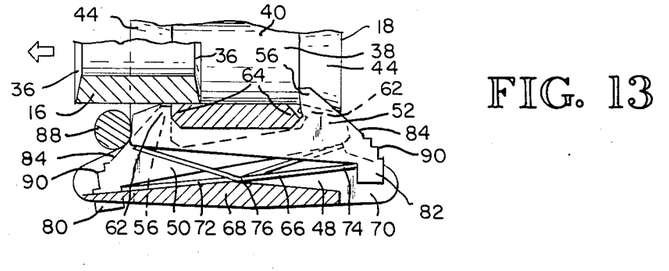
FIG. 13 is an enlarged fragmentary sectional side view of the swivel body of FIG. 12 with a tool depressing one engagement art to allow axial movement of the stop sleeve out of the swivel body.
Figure 14:
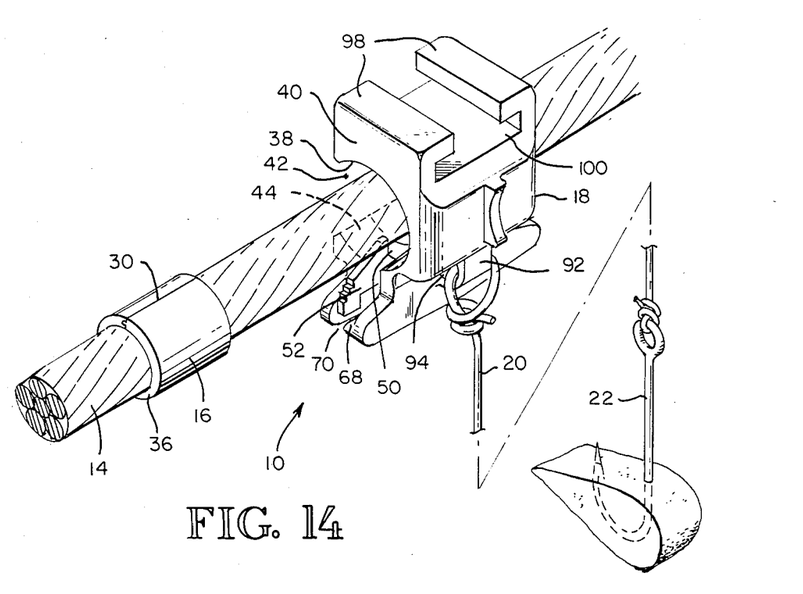
FIG. 14 is an enlarged perspective view of the swivel body of FIG. 8, with a gangion attached, positioned on the longline in preparation for passage of the stop sleeve into the swivel body.

The cam 84 also provides a convenient means for detaching the swivel body 18 from the stop sleeve 16. As best shown in FIG. 4, where the longline 14 is being hauled in over a conventional side roller 86 mounted to the side of the boat, a fixed pin 88 is positioned to engage the cam as the line carries the swivel body 18 along. The pin 88 is positioned adjacent to the longline 14 to enter between the longline and the cam 84 as the longline carries the swivel body 18 toward the pin. The pin 88 moves the cam 84 to place one of the engagement arms 50 and 52 into the retracted position, using the longline 14 to apply the counterforce to the pin. The pin 88 is shown engaging the cam 84 of the arm 50 and depressing the arm into the retracted position in FIG. 13, with the stop sleeve 16 partially removed from the body aperture 38 of the swivel body 18. In this manner, the swivel body 18 can be removed from the longline 14 from either end opening 44, relying only on the power of the travelling longline bringing the cam 84 into engagement with the stationary pin 88. The pin 88 may be carried on an appropriate support stand attached to the boat or may be made part of a hand-held tool.

The first end portions 54 of the arms 50 and 52 each further include a knurled portion 90 positioned for easy access by the hand of an operator for manually moving the arms into the retracted position to remove the stop sleeve 16.

The swivel body 18 includes an ear 92 with an aperture 94 therethrough for tying the gangion 20 to the swivel body 18. The aperture 94 is sized to receive the gangion 20 and also to receive and frictionally retain therein the barbed end of the hook 22 attached to the gangion to provide a convenient mousing point. The ear 92 is positioned along an axial midportion of the body sidewall 40 and projects outwardly therefrom, generally away from the body sidewall opening 42. The ear 92 is circumferentially positioned away from the body sidewall opening 42 sufficiently to rotate the swivel body 18 on the stop sleeve 16 and place the sidewall opening generally upward under the weight of the gangion 20 to facilitate the swivel body 18 falling free of the longline 14 by gravity, upon placing the appropriate one of the arms 50 and 52 into the retracted position and passage of the stop sleeve 16 from the body aperture 38 when the longline has a generally horizontal attitude. The weight of the swivel body 18 is distributed so as to tend to rotate the body on the longline 14 around the stop sleeve 16 when the longline is in a generally horizontal attitude to place the sidewall opening 42 generally upward to also facilitate the body falling free of the longline by gravity.

Figure 9:
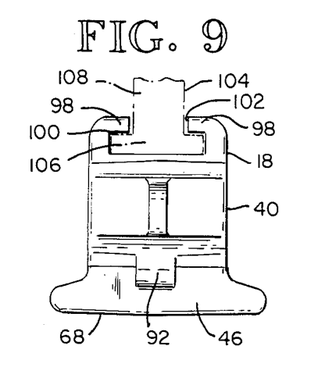
FIG. 9 is a rear elevational view of the swivel body of FIG. 8.

The swivel body 18 has a pair of opposing guide arms 98 attached to the body sidewall 40 circumferentially opposite the channel 46. The guide arms 98 extend transverse to the body aperture 38 and are positioned radially outward of the body sidewall 40 to define a transverse guide opening 100. The guide arms 98 project toward each other to define a passageway 102 therebetween. As will be described in more detail below, the guide opening 100 is sized to slidably receive a track 104. As shown in Figure 9, the track 104 has a flange portion 106 positionable in the guide opening 100 for the guide arms 98 to slidably engage and support the weight of the swivel body 18 thereon, and a web portion 108 fixedly attached to the flange portion and extending through the passageway 102.

Figure 2:
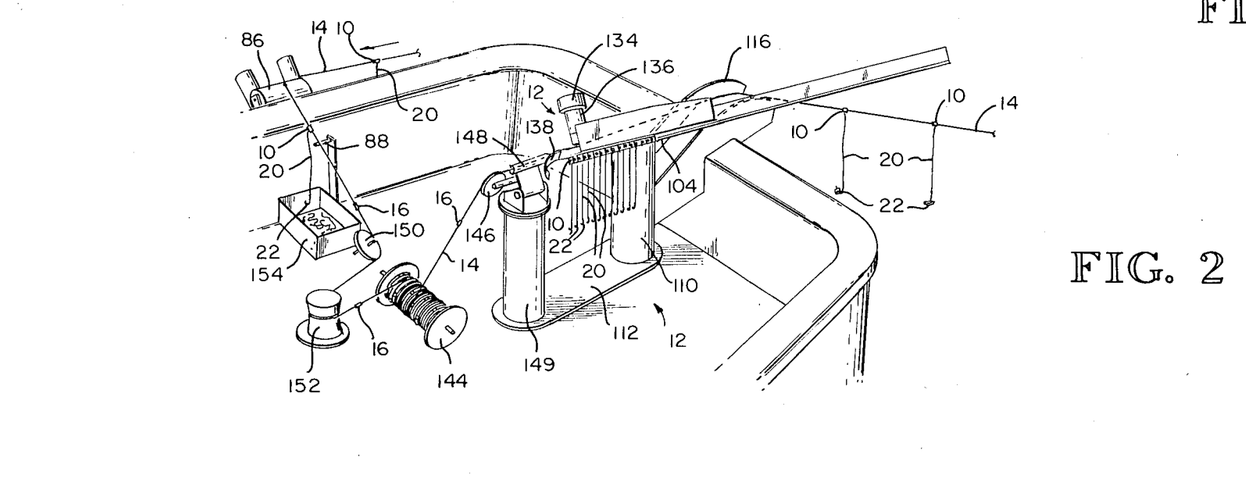
FIG. 2 is an enlarged perspective view of the fishing boat of FIG. 1 showing both an apparatus embodying the present invention automatically attaching the swivel devices to the longline as it is set out, and a longline being hauled in, with the swivel devices being automatically detached from the longline, for purposes of illustration showing both processes as if occurring at the same time.
Figure 3:
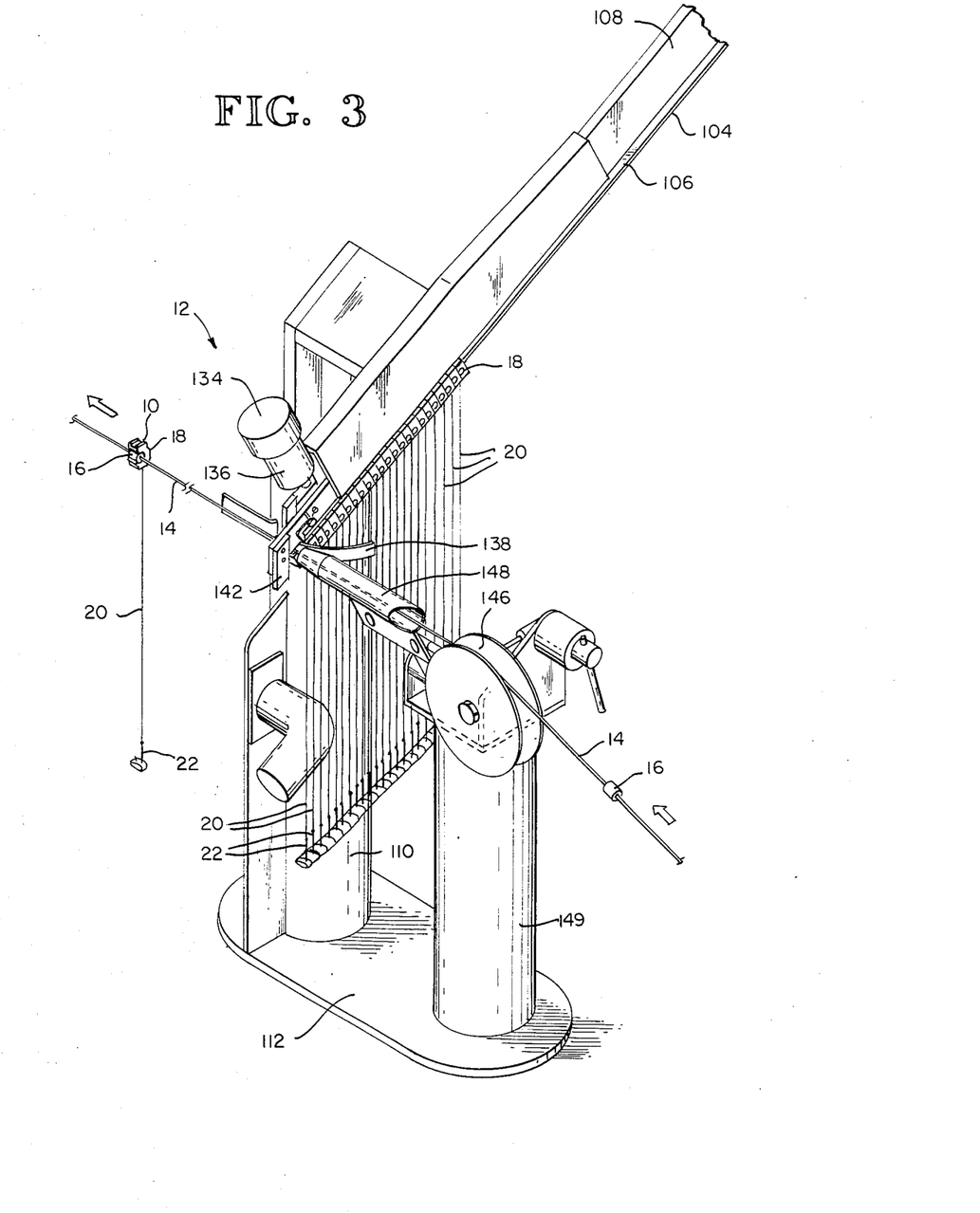
FIG. 3 is an enlarged perspective view of the loading apparatus shown in FIG. 2.
Figure 15:
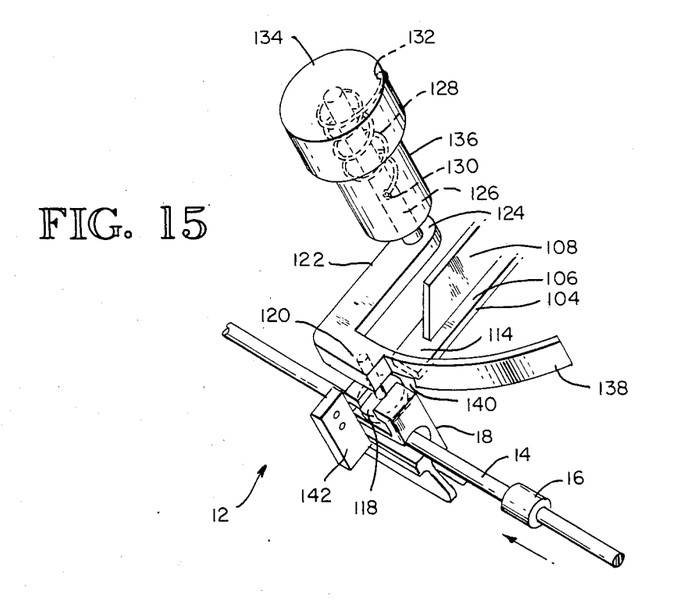
FIG. 15 is an enlarged fragmentary perspective view of the apparatus shown in FIG. 2 showing a swivel body in phantom being held in position for attachment to the longline.

The apparatus 12 for attaching the swivel body 18 to the longline 14 is best shown in FIGS. 2, 3 and 15. The apparatus 12 is supported on a pedestal 110 fixedly attached to the deck of the boat by an attachment plate 112. The track 104 is removable from the apparatus 12 for preloading of the swivel bodies 18 with gangions 20 having their hooks 22 baited. The track 104 is insertable in the apparatus 12 with a downwardly inclined orientation, with the flange 106 of the track slidably carrying a plurality of swivel bodies 18 by the guide arms 98 for dispensing the swivel bodies at a lower end portion 114 of the track. The swivel bodies 18 are loaded on the track 104 with the body sidewall opening 42 facing downward toward the track lower end 114. The swivel bodies 18 are guided by the track 104 and gravity fed downward toward the longline 14 positioned at the lower end 114 of the track. The longline 14 extends generally transverse to the track 104.

The track 104 sequentially feeds individual ones of the swivel bodies 18 loaded thereon to a disc-shaped carrier 118 positioned to receive individual swivel bodies 18 from the track lower end 114. The carrier 118 is attached to a free end 120 of a swing arm 122 and is held by the arm in a home position at the lower end 114 of the track 104. In the home position, the carrier 18 releasably receives and holds one of the swivel bodies 18 received from the track 104, with the longline 14 extending through the body aperture 38 of the body, in preparation for passage of one of the stop sleeves 16 into the body aperture for retention therein by the engagement arms 50 and 52 as the longline is set out. The carrier 118 and the track lower end 114 are positioned for the swivel body to travel toward the longline 14 and encounter a portion of the longline 14 extending between two successive stop sleeves 16. The longline 14 passes laterally through the sidewall opening 42 of the received swivel body 18 as the swivel body travels from the track lower end 114 to the carrier 118. The guide arms 98 of the body 18 slide from the flange 106 of the track 104 onto the carrier 118 as the body travels from the track lower end 114.

The swing arm 122 is attached by a second end 124 to a pivot pin 126 for pivotal movement of the free arm end in the general direction of travel of the longline 14 as it is set out. the swing arm 122 restricts movement of the carrier 118 in an arcuate path in response to the longline 14 pulling the stop sleeve 16, which has been moved into the body aperture 38 of the swivel body being carried by the disc 118 and locked therein by the engagement arms 50 and 52. As the swing arm 122 moves the disc 118 in the arcuate path, the disc tends to pull laterally out from between the guide arms 98 of the swivel body 18 being carried; and at a release position away from the track lower end 114, the body is released from the carrier.

A torsion spring 128 is coiled around the pivot pin 126 and is fixedly attached to the pin by one end 130 and is fixedly attached by an opposite end 132 to an adjustable cap 134. The cap 134 is selectively rotatable to set the torsion of the spring 128 and is connected through a cylindrical cover 136 to the stationary support pedestal 110 of the apparatus 12. The swing arm 122 is biased by the spring 128 to return the carrier 118 to the home position at the lower end 114 of the track 104 to receive the next swivel body 18.

To control feeding of the swivel bodies 18 from the track 104 to the carrier 118, an arcuate retainer wall 138 is fixedly attached to the free end 120 of the swing arm 122 for movement therewith. The retainer wall 138 has an opening 140 therethrough located to permit free travel of a swivel body from the track lower end 114 to the carrier 118 when the carrier is in the home position. The retainer wall 138 extends in a direction generally opposite the direction of movement of the longline 14 when it is being set out and has an arcuate shape to maintain the wall adjacent to the track lower end 114 as the swing arm is pivoted to move the carrier 118 to and from the release position. When the carrier 118 is moved away from the home position, the retainer wall blocks travel of the swivel bodies 18 remaining on the track 108 until the empty carrier returns to the home position.

A stop 142 is positioned spaced apart from the track lower end 114 sufficiently for the carrier 118 to be moved therebetween and to limit the travel of the swivel body 18 received on the carrier 118. The stop 142 prevents the force of the remaining swivel bodies 18 on the track 104 from pushing the received swivel body off of the carrier 118. The stop 142 also helps in maintaining the swivel body 18 received by the carrier 118 in the proper position on the carrier, with the longline 14 extending through the body aperture 38 in preparation for passage of the next stop sleeve 16 into the body aperture of the swivel body. With the attachment apparatus 12 just described, a plurality of swivel bodies 18 can be loaded on the track 104 and gravity fed; and the swivel bodies are attached to the longline and removed from the apparatus by the movement of the longline as it is set out, without requiring any other electrical or mechanical power being supplied.

As best shown in FIGS. 2 and 3, the longline 14 is fed out from a drum 144 on which the longline has been stored as it was hauled in. The longline 14 passes off the drum 144 over a guide sheave 146 and through an alignment tube 148 past the lower end 114 of the track 104 loaded with swivel bodies 18 having gangions 20 with baited hooks 22. The sheave 146 and tube 148 are supported by a second pedestal 149 fixedly attached to the deck of the boat by the attachment plate 112. The swivel bodies 18 are individually guided onto a portion of the longline 14 extending between two successive stop sleeves 16, and the next stop sleeve that reaches the swivel body on the carrier 118 moves into the body aperture 38 and is captured therein by the engagement arms 50 and 52. The pulling force of the longline 14 as it is being set out pulls the swivel body 18, which has been attached to the longline, free of the apparatus 12, and carries it rearwardly over a chute 118 projecting from the stern of the boat, as shown in Figures 1 and 2, and into the water.

After the longline 14 has been in the water a desired length of time, either end of the longline may be picked up by the operator of the boat and placed over the side roller 86 for hauling in. The longline 14 is guided by a guide sheave 150 and wrapped around a powered hauler 152 and attached to the drum 144, which is empty and ready for wrapping of the longline. After the longline passes over the side roller 86, it passes by the fixed pin 88, which engages the cam 84 of whichever of the arms 50 and 52 is located toward the pin, and frees the stop sleeve 16 from the body aperture 38. This allows the swivel body 18 to fall off the longline 14 as the longline passing out of the sidewall aperture 42, and drop into a collection box 154. The hooks 22 can then be cleaned and baited, and the swivel bodies 18 again loaded onto the track 104 for reattachment to the longline 14 when it is next set out. The longline 14 is wound on the drum 144, free of the swivel bodies 18 and the gangions, thus eliminating entanglement problems. As with the attachment of the swivel bodies 18 to the longline 14, the detachment of the swivel bodies is also accomplished using only the pulling force of the longline engaging the cam 84 against the pin 88 without requiring any additional electrical or mechanical power.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A device for connecting a gangion to a continuous longline, comprising:

a substantially cylindrical stop sleeve having an axial aperture sized for receiving the longline therein, said sleeve being fixedly mountable on the longline; and a detachable swivel body with a substantially cylindrical aperture therethrough sized for rotatably receiving said stop sleeve therein and a fixed sidewall opening communicating with said body aperture and sized large enough to allow lateral passage of the longline but small enough to prevent passage of said sop sleeve therethrough, said body having a body portion for attachment of the gangion thereto and engagement members spaced apart for receiving said stop sleeve therebetween when said stop sleeve is positioned in said body aperture and restraining axial movement of said body relative to said stop sleeve while permitting rotational movement thereabout, said engagement members permitting said stop sleeve to pass freely into said body aperture from either end opening of said body aperture and being individually operable for selectively permitting said stop sleeve to pass out of said body aperture from either end opening of said body aperture, whereby said swivel body is restrained against longitudinal movement of the longline but is free to swivel thereabout to prevent entanglement during fishing and hauling in of the longline, and said swivel body is easily attachable to and detachable from the longline by said stop sleeve passing into and out of said body aperture from either end of said body.

2. The device of claim 1 wherein said stop sleeve has an axial sidewall opening communicating with said stop sleeve aperture for permitting placement of said stop sleeve around the longline at a preselected location, said sidewall opening being selectively closable with the longline in said sleeve aperture and said sleeve aperture being sized to tightly grasp the longline when said sidewall opening is closed.

3. The device of claim 2 wherein said sidewall opening is defined by opposing edge walls of said sleeve sidewalls, one of said edge walls having an axially extending tongue and the other of said edge walls having a mating axially extending groove to receive said tongue therein when said sidewall opening is closed.

4. The device of claim 1 wherein said body aperture has outwardly bevelled end openings to facilitate entry of said stop sleeve.

5. The device of claim 1 wherein said body portion for attachment of the gangions is circumferentially positioned away from said body sidewall opening sufficiently to rotate said body and place said sidewall opening generally upward under the weight of the gangions to facilitate said body falling free of the longline by gravity upon operation of one of said engagement members and passage of said stop sleeve from said body aperture when the longline has a generally horizontal attitude.

6. The device of claim 1 wherein said weight of said body is distributed to rotate said body on the longline when in a generally horizontal attitude and place said sidewall opening generally upward to facilitate said body falling free of the longline by gravity upon operation of one of said engagement members and passage of said stop sleeve from said body aperture.

7. The device of claim 6 wherein said body portion for attachment of the gangion is circumferentially positioned away from said body sidewall opening.

8. The device of claim 1 wherein said engagement members are located toward opposite ends of said body aperture.

9. The device of claim 1 wherein said engagement members have opposing stops for engaging opposite end portions of said stop sleeve when positioned therebetween and maintaining said stop sleeve in said body aperture, said engagement members being biased into a projecting position for engagement of said stops with said stop sleeve and being individually and selectively movable into a retracted position for entry and release of said stop sleeve into and out of said body aperture.

10. The device of claim 9 wherein said engagement members each have a cam portion engageable with a tool and said stop sleeve for moving said engagement member into said retracted position, said cam being positioned for engagement with said stop sleeve when the longline travels through said body aperture prior to passage of said stop sleeve into said body aperture.

11. The device of claim 9 wherein said engagement members each have a lever portion for manually moving said engagement member into said retracted position.

12. The device of claim 1 wherein said engagement members are a pair of oppositely oriented, axially extending elongated arms positioned side by side, said arms each having a first end portion with an inwardly facing stop opposing said stop of the other arm, said stops being spaced apart for engaging opposing ends of said stop sleeve and restraining said stop sleeve therebetween, and said arms each having an opposite second end portion with an inwardly facing hook opposing said hook of the other arm, said hooks being positioned for engaging a portion of said body and preventing axial movement of said arms relative to said body when one of said arm stops forcefully engages a corresponding one of said stop sleeve ends, whereby axial force between said stop sleeve and said arm stops is transmitted through said arm hooks.

13. The device of claim 12 wherein said engagement arms are resiliently biased into a projecting position for engagement of said stops with said stop sleeve ends to maintain said stop sleeve in said body aperture, and are individually and selectively movable into a retracted position for entry and release of said stop sleeve into and from said body aperture.

14. The device of claim 13 wherein said first end portions of said engagement arms each have a cam portion engageable with a tool and said stop sleeve for moving said engagement member into said retracted position.

15. The device of claim 14 wherein said cam projects axially outward beyond said body and slopes outwardly and away from the axial center line of said body aperture, said cams being movable away from the axial center line upon engagement with a tool or said stop sleeve to move said engagement arm into said retracted position, whereby a stationary tool positioned adjacent to the longline will enter between the longline and said cam portion as the longline carries said body toward the tool and can then move said cam to place said engagement arm into said retracted position using the longline to apply the counterforce to the tool, relying only on the power of the travelling longline.

16. The device of claim 14 wherein said first end portions of said engagement arms are manually operable to move said engagement arms into said retracted position.

17. The device of claim 13 wherein said bias is applied to said engagement arms by a spring, said spring having a first pair of oppositely extending leaf springs for biasing one of said engagement arms into said projecting position, and a second pair of oppositely extending leaf springs positioned adjacent to said first pair of leaf springs for biasing the other of said engagement arms into said projecting position, said two pairs of leaf springs being joined along their midportions.

18. The device of claim 1 wherein said swivel body further includes means for slidably engaging a feed track, whereby a plurality of said swivel bodies can be preloaded onto a feed track in preparation for automatic attachment to the longline.

19. The device of claim 1 wherein said body portion for attachment of the gangion is an aperture sized to receive the gangion, said gangion aperture having sufficient size to also receive and frictionally retain therein the barbed end of a hook attached to the gangion.

20. A device for connecting a gangion to a continuous longline, comprising:
a stop member fixedly attached to the longline; and
a swivel body with an aperture therethrough sized for rotatably receiving said stop member wholly therein and a sidewall opening communicating with said body aperture and sized for passage of the longline laterally therethrough for attaching and detaching of said body, said body aperture having axial end openings for passage of said stop member into and out of said body aperture from either of said end openings, said body further having means for attachment of the gangion to said body, and restraining means for releasably restraining said stop member in said body against axial movement, whereby axial movement of said body relative to said stop member is selectively inhibited to prevent longitudinal movement of said body along the longline during fishing and hauling while permitting rotational movement thereabout, and whereby axial movement is selectively allowed to permit axial movement of said stop member out of said body aperture for attaching or detaching of said body to and from the longline.

21. The device of claim 20 wherein said body is mountable on the longline with said body aperture in substantial axial alignment therewith, said sidewall opening being sized to inhibit lateral movement of said stop member into said body aperture from either of said end openings.

22. The device of claim 21 wherein said restraining means includes spaced-apart stops positioned toward each of said body end openings to each side of said stop member when said stop member is in said body aperture.

23. The device of claim 20 wherein said stop member has an aperture sized for receiving and fixedly holding the longline therein.

24. The device of claim 20 wherein said restraining means includes a pair of stops spaced apart for positioning of said stop member therebetween, said stops being individually and selectively movable to permit entry and release of said stop sleeve into and from said body aperture from either end opening of said body aperture.

25. The device of claim 24 wherein said restraining means further includes a cam operatively connected to each of said stops and positioned for engagement with a tool or said stop sleeve for moving said stops to permit passage of said stop sleeve into or out of said body aperture.

26. A device for connecting a gangion to a continuous longline having a stop member fixedly attached to the longline, comprising a swivel body with an aperture therethrough sized for rotatably receiving the stop member wholly therein and a sidewall opening communicating with said body aperture and sized for passage of the longline laterally therethrough for attaching and detaching of said body, said body aperture having axial end openings for passage of said stop member into and out of said body aperture from either of said end openings, said body further having means for attachment of the gangion to said body, and restraining means for releasably restraining the stop member in said body against axial movement, whereby axial movement of said body relative to the stop member is selectively inhibited to prevent longitudinal movement of said body along the longline during fishing and hauling while permitting rotational movement thereabout, and whereby axial movement is selectively allowed to permit axial movement of the stop member out of said body aperture for attaching and detaching of said body to and from the longline.

27. An apparatus for attaching a swivel body carrying a gangion, to a longline while the longline is being set out, the longline having stop members fixedly attached at spaced apart intervals and the body having an aperture therethrough sized for rotatably receiving the stop member therein and a sidewall opening communicating with the body aperture and sized for lateral passage of the longline therethrough, the body further having restraining members for releasably restraining the stop member in the body aperture against axial movement, comprising:

a downwardly inclined track for loading with a plurality of the swivel bodies, the bodies being oriented with a plurality of the swivel bodies, the bodies being oriented with the body sidewall opening facing downwardly and guided by said track for gravity-feed downward movement toward the longline, the longline being positioned at a lower dispensing end of the track and extending generally transverse thereto;

a swing arm having a free end with a carrier positioned to sequentially receive individual swivel bodies from said tract lower end and to releasably hold the received body in position, with the longline extending through the body aperture in preparation for passage of one of the stop members into the body aperture for retention therein by the body-restraining members as the longline is set out, said carrier and track lower end being positioned for the swivel body to travel toward the longline and have the longline pass laterally through the sidewall opening of the received body as the body travels from said track lower end to said carrier, said swing arm being mounted for pivotal movement of said free arm end in the general direction of the longline movement responsive to the longline being set out with one of the stop members within the body aperture of the received body, said swing arm moving said carrier in an arcuate path to a release position away from said track lower end whereat the received body is released from said carrier, said swing arm being biased to return said carrier to a home position to receive the next swivel body;

an arcuate retainer wall attached to said swing arm for movement therewith and having an opening therethrough to permit free travel of a swivel body from said track lower end to said carrier when said carrier is in said home position, said retainer wall extending in a direction to retain the remainder of the swivel bodies on said track as said carrier moves away from said home position to or from said release position; and a stop guide positioned spaced apart from said track lower end sufficiently for said carrier to be moved therebetween, said stop guide limiting travel of the swivel body received by said carrier from said track and maintaining the received swivel body in position on said carrier in preparation for movement therewith, whereby a plurality of swivel bodies can be loaded on the track and gravity fed, and the bodies are attached to the longline and removed from the apparatus by the movement of the longline as it is set out.

28. The apparatus of claim 27 for attaching a swivel body with a pair of opposing guide arms, wherein said track has a downwardly inclined slide plate for slidably receiving and dispensing the bodies, and said carrier is a disc sized to be slidably received by the guide arms of the received body and released from the guide arms when said swing arm moves said carrier to said release position.

29. The apparatus of claim 27 wherein said track is removable for preloading and selectively insertable in the apparatus for dispensing of the preloaded swivel bodies.

30. An apparatus for attaching a swivel body carrying a gangion to a longline while the longline is being set out, the longline having stop members fixedly attached at spaced-apart intervals and the body having an aperture therethrough sized for rotatably receiving the stop member therein and a sidewall opening communicating with the body aperture and sized for lateral passage of the longline therethrough, the body further having restraining members for releasably restraining the stop member in the body aperture against axial movement, comprising:

feed means for sequentially feeding individual ones of a plurality of the swivel bodies onto the longline, with the longline passing laterally through the body sidewall opening;

positioning means for receiving the swivel body from said feed means and holding the received body in position, with the longline extending through the body aperture in preparation for passage of one of the stop members attached to the longline into the body aperture for retention therein by the bodyrestraining members as the longline is set out;

release means for selectively releasing the received swivel body with one of the stop members within the body aperture means; and control means for selectively permitting travel of a swivel body to said positioning means for said feed means, and restricting travel of the next swivel body to be fed by said feed means until the swivel body received by said positioning means has been released by said release means.

31. A device for connecting a gangion to a continuous longline, comprising:

a stop member fixedly attached to the longline; and a swivel body with an aperture therethrough sized for rotatably receiving said stop member at least partially therein and a fixed sidewall opening communicating with said body aperture and sized for passage of the longline laterally therethrough for attaching and detaching of said body, said body aperture having axial end openings for passage of said stop member into and out of said body aperture from either of said end openings, said body further having means for attachment of the gangion to said body, and restraining means for releasably restraining said stop member in said body against axial movement.

* * * * *